UNITED STATES PATENT OFFICE 2,218,531

PHENOLS FROM CASHEW NUT SHELL LIQUID AND METHOD OF OBTAINING THE SAME

Mortimer T. Harvey, East Orange, N. J., assignor to The Harvel Corporation, a corporation of New Jersey No Drawing. Application April 22, 1937,
Serial No. 138,373

6 Claims. (Cl. 260—624)

The present invention, relates generally, to products obtained by cracking and distilling cashew nut shell liquid, to the residues from such distillations, and to methods and steps of making such distillations and of treating intermediate products thereof to secure other products of the invention. The products of the invention are useful as and in the arts of germicides, colors, dyes, perfumes, flavors, solvents and plasticizers for cellulose esters, and bases for the several ones of these products, for making resins for coatings, molded and other products, and for use in the arts generally.

Methods and steps for producing all of the above products will be given below, but at the first my disclosure will be directed more particularly to the making of germicides with other products or intermediates therefor.

Certain inventions described herein, but not claimed, are claimed in my copending application Serial Number 303,815, filed November 10, 1939.

It is well known that raw cashew nut shell liquid has been used for many years, particularly in India, for purpose of protecting furniture, timbers, and so on against certain species of ants and other insects which devour wood, but the raw cashew nut shell liquid does not have the germicidal qualities of the products of the invention and has the disadvantage of a vesicant action on the skin, not present in the products of the present invention.

Raw cashew nut shell liquid is composed of about ninety per cent of anacardic acid and about ten per cent of cardol. By the distilling steps of the present invention these materials are for the most part cracked or dissociated to form comparatively large molecule phenols, water and some other materials. The phenols produced are non-toxic, can be separated from the other products of the distillation and have various other characteristics and the other products have useful applications, as set forth hereinafter.

I have discovered that a valuable preparation having a high germicidal coefficient can be made from cashew nut shell liquid by the method and steps hereinafter fully set forth. The exact composition of these preparations has not yet been determined. These compounds however are much stronger in germicidal effect than phenol and a sample mixture comprising 30% of a product of the invention and 70% of water gave a phenol coefficient of 5.25 in a germicidal test on *Bacillus typhosus* made with the 1921 modification of Rideal-Walker method.

The details of this particular test are given in the table below. The germicidal product referred to in the above paragraph is denoted as "disinfectant" in the table below and is compared with phenol.

Germicidal test
Rideal-Walker method (1921 modification)
Organism—*B. typhosus* (Hopkins)
Age of culture—24 hours at 37° C.
Medium-Rideal-Walker beef extract broth
Organic matter—None
Temperature of medication—18°C.
Dose=0.5 c. c. of filtered culture to 5 c. c. of diluted disinfectant
Subcultures=One 4 mm. loopful to 10 c. c. of broth
The subcultures were incubated 47 hours at 37° C. with the following results:

| Sample | Dilution | Minutes of exposure to disinfectant | | | | | |
|---|---|---|---|---|---|---|---|
| | | 2½ | 5 | 7½ | 10 | 12½ | 15 |
| Disinfectant (30% solids) rec'd 9/29/30 | 1:300 | Minus | Minus | Minus | Minus | Minus | Minus. |
| | 1:350 | ---do--- | ---do--- | ---do--- | ---do--- | ---do--- | Do. |
| | 1:400 | ---do--- | ---do--- | ---do--- | ---do--- | ---do--- | Do. |
| | 1:450 | Plus | ---do--- | ---do--- | ---do--- | ---do--- | Do. |
| | 1:500 | ---do--- | Plus | ---do--- | ---do--- | ---do--- | Do. |
| | 1:550 | ---do--- | ---do--- | Plus | ---do--- | ---do--- | Do. |
| | 1:600 | ---do--- | ---do--- | ---do--- | ---do--- | Plus | Plus. |
| Phenol | 1:90 | ---do--- | Minus | Minus | ---do--- | Minus | Minus. |
| | 1:100 | ---do--- | Plus | Plus | ---do--- | ---do--- | Do. |

$$\text{Phenol coefficient} = \frac{450}{90} \cdot \frac{550}{100} = 5.25$$

For purposes of example two methods of making the germicidal preparations of the invention are given below, identified respectively as method A and method B. In both these methods the cashew nut shell liquid used was given a preliminary heating at about 450° F. to drive off moisture contained therein whereby frothing would be avoided in heating at the higher temperatures shown in the disclosure of these methods. Hereinafter the cashew nut shell liquid which has been given the preliminary heating is referred to as dehydrated cashew nut shell liquid or the dehydrated liquid.

*Method 1.*—In one method of the invention a quantity of the dehydrated liquid was cracked and distilled at atmospheric temperature from a copper container through an iron pipe, until a residue was left which was approximately 50% of the weight of the original amount of dehydrated oil used. A thermometer used to determine the temperature had its bulb at the bottom of an iron tube which latter had its closed inner end extending into the liquid and its outer open end sealed at an opening in the cover of the copper container. A quantity of cylinder oil was placed in the tube containing the thermometer to immerse the thermometer bulb for the purpose of protecting the latter against sudden changes in temperature. The distillation started with a few drops at about 580° F.; at 700° the drops of distillate commenced to flow faster; and the flow of distillate reached approximately maximum at about 720° F. The bulk of distillate came over between 720° and 730° F. The total distillate, except a water solution B which separates out at the bottom, is identified here as distillate A for convenience in setting forth the methods of the invention.

The residue, C, is a tarry looking substance which I have found to be very black, is oil soluble; and is valuable for use in japans, paints, enamels and the like because of the above given qualities and particularly because it gives a real black color when used with vehicles such as linseed oil, China-wood oil and cashew nut shell liquid. This oil soluble black residue and materials made therefrom will be claimed in a divisional patent application drawn thereto.

To 100 parts of distillate A were added about 20 parts of powdered caustic soda, by weight, and placed in a glass container under a reflux condenser, and heated for about 2½ hours at about 300° F.

The refluxed liquid was distilled at about 300° F. and the distillate D and residue E saved. Distillate D is useful as a solvent for cellulose acetate and cellulose nitrate lacquers, and oil paints and varnishes.

The residue E is then added to an equal volume of water for removing water solubles formed during or remaining after the reaction with caustic under the reflux. This mixture was separated in a separatory funnel into water solution F and liquid G. The solution F is the "disinfectant" set forth in the Rideal-Walker test table given above.

The liquid G is a base for making dyes, perfumes and flavors by various reactions such as nitration, reduction, and reactions with metals. This liquid G contains a breakdown product of anacardic acid called "Cardanol", described and claimed in my copending application Ser. No. 703,414. Cardanol can be separated by distillation, for example, at about 199° to 200° C. at about 7 to 9 millimeters pressure and is suitable for making resins, factis, coatings, molded products and the like as by reaction with formaldehyde, acids such as sulphuric, hydrochloric and so on, driers such as lead oxide, manganese dioxide and other well known commercial driers. It can be used for making resins with the cresols (for example, any of the cresylic acids) and formaldehyde, which resins are soluble in China-wood oil, linseed oil or other drying oils, or in varnishes made of any of these oils. A resin made of two parts cresylic acid and one part anacardic acid by weight with about five to ten per cent formaldehyde, for example, is soluble in equal parts and other ratios of China-wood, linseed or other drying oils or varnish thereof. Like anacardic acid Cardanol can also be used in making glyptal type resins with glycerine and phthalic anhydride by substituting it for oleic or corresponding acid in molecule proportion in various ones of the formulas given in the literature.

*Method 2.*—A second method differs from Method 1 in that the entire distillate at the beginning, that is, distillate A and water solution B, was placed in a separatory funnel and let stand to allow distillate A and the water solution B to separate more fully. Distillate A is then distilled at a range of about 140° to 290° F. to secure a liquid distillate H and liquid residue I. To 100 parts of residue I were added about 15 parts by weight of powdered caustic soda and the mixture heated for about 2½ hours at about 300° F. under a reflux condenser, after which it was allowed to cool and about an equal volume of water was added and let stand in a separatory funnel. Separation took place into two layers consisting of an upper liquid K corresponding to liquid G above and a lower water solution L, which latter is a germicide like solution F of Method 1 above.

*Method 3.*—A third method or variation is to distill distillate A, of Method 1 or 2, in a range of about 300° to 460° F. to secure a residue M and a distillate N. The residue M corresponds to liquid G and liquid K, above, contains Cardanol, and is suitable for the purposes given therefor to which reference is hereby made. Distillate N, when treated with caustic or alcohol, to form a liquid O, is a germicide and corresponds to solution F and solution L above.

Solution F, solution L and liquid O are suitable for use for hygienic purposes and for general disinfection of walls, floors and other places, generally with dilution with water, with or without the addition of soda, soaps, alcohol or the like to aid in making a solution. Also, for hygienic and other purposes, the caustic can be entirely removed or the amount decreased, by neutralizing with an acid such as hydrochloric and removing the neutralized germicide from the water solution of caustic. The neutralized germicide when diluted with alcohol, or with water with the addition of small amounts of caustic, and/or alcohol to aid in solution is again for general use.

In the above Methods 1, 2 and 3 caustic materials other than caustic soda can be used for refluxing, for example, caustic potash, soda ash, sodium bicarbonate, ammonium carbon, ammonium hydroxide, lime, rosin or soya bean soaps and other soaps and so on. Also in place of using solid caustic material, caustic solutions can be used. These materials can also be used in preparing solutions or dispersions of the germicide for use. For this latter purpose gum arabic, agar-agar and furfur-aldehyde can be used. A notable characteristic of the germicide of the invention, for example, solution F, solution L, and liquid O, is that it is not toxic, in remarkable contrast to phenol and cresols which are well known to be highly toxic.

From the above descriptions of the germicide of the present invention and of the methods and steps in producing the same, it appears that the germicide of the invention is that part of cashew nut shell liquid distillate which is miscible with water in the presence of caustic.

Cashew nut shell liquid is destructively distilled with steam, for example, at between 230° F. and 300° F. to bring over a phenol which is insoluble in water and insoluble in alkaline solutions and in the residue left after the distillate is a phenolic compound which is insoluble in water and insoluble in alkaline solutions. The residue and the distillate phenols are each reactive with aldehydes (e. g. formaldehyde) to produce resinous condensation products.

When about 50% to about 75% of the cashew nut shell liquid has been removed by destructive distillation either with or without steam and at normal pressure or at reduced pressure the residue is of heavier viscosity than cashew nut shell liquid, and with the greater degree of distillation reaches a thick tarry state.

Having thus described my invention what I claim and desire to protect by Letters Patent is:

1. The method which comprises destructively distilling cashew nut shell liquid and separating alkali insoluble phenols from the distillate and the residue.

2. The alkali insoluble phenols produced by the destructive distillation of cashew nut shell liquid.

3. A cracked distillate product of cashew nut shell liquid obtained at a temperature range between 650° and 750° F., approximately, said distillate being liquid at normal temperatures and being insoluble in water and in alkaline solutions.

4. The tarry residual products obtained by distilling cashew nut shell liquid at a temperature between about 650° F. and 750° F.

5. That part of the liquid product obtained by distilling cashew nut shell liquid up to about 750° F. which is insoluble in water and insoluble in caustic soda solution.

6. The water and alkali insoluble phenolic residue left when cashew nut shell liquid is destructively distilled with steam.

MORTIMER T. HARVEY.